US010840697B2

(12) United States Patent
Chen et al.

(10) Patent No.: US 10,840,697 B2
(45) Date of Patent: Nov. 17, 2020

(54) POWER SUPPLY SYSTEM COMPATIBLE WITH MULTIPLE COMMUNICATION INTERFACE SPECIFICATIONS AND POWER RECEIVER CIRCUIT THEREOF

(71) Applicant: RICHTEK TECHNOLOGY CORPORATION, Zhubei, HsinChu (TW)

(72) Inventors: Shung-Tsung Chen, Hsinchu (TW); Yi-Syue Jhu, New Taipei (TW); Chieh-Min Lo, Miaoli (TW); Tsung-Han Tsai, Taoyuan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 83 days.

(21) Appl. No.: 16/354,129

(22) Filed: Mar. 14, 2019

(65) Prior Publication Data

US 2019/0341770 A1 Nov. 7, 2019

(30) Foreign Application Priority Data

May 4, 2018 (CN) .......................... 2018 1 0419833

(51) Int. Cl.
*H02H 7/20* (2006.01)
*H02H 1/00* (2006.01)
*G01V 3/04* (2006.01)
*H01R 13/66* (2006.01)

(52) U.S. Cl.
CPC .............. *H02H 7/20* (2013.01); *G01V 3/04* (2013.01); *H02H 1/0007* (2013.01); *H01R 13/6675* (2013.01); *H01R 13/6683* (2013.01)

(58) Field of Classification Search
CPC .. H01R 13/6683; H01R 13/6675; G01V 3/04; H02H 7/20; H02H 1/0007
See application file for complete search history.

(56) References Cited

U.S. PATENT DOCUMENTS

| | | | |
|---|---|---|---|
| 2006/0206650 A1* | 9/2006 | Chang ................. | G06F 13/4027 710/306 |
| 2015/0008749 A1* | 1/2015 | Rhee ...................... | H01R 29/00 307/80 |
| 2016/0141810 A1* | 5/2016 | Kashyap .............. | H01R 13/665 439/620.01 |
| 2017/0277251 A1* | 9/2017 | Gong ...................... | G06F 1/266 |

* cited by examiner

*Primary Examiner* — Jared Fureman
*Assistant Examiner* — Duc M Pham
(74) *Attorney, Agent, or Firm* — Tung & Associates

(57) ABSTRACT

A power supply system includes a power supplier circuit and a power receiver circuit. The power supplier circuit supplies a power via a communication interface compatible with a first communication interface specification or a second communication interface specification. The first communication interface specification includes a delay threshold. After the power supplier circuit is coupled to the power receiver circuit, the power supplier circuit supplies the power after a first delay period. The power receiver circuit confirms whether the power supplier circuit is coupled to the power receiver circuit via a coupling confirmation step according to the first communication interface specification. The power receiver circuit confirms whether the power supplier circuit is compatible with the first communication interface specification or the second communication interface specification according to whether the first delay period is greater than the delay threshold.

14 Claims, 3 Drawing Sheets

US 10,840,697 B2

POWER SUPPLY SYSTEM COMPATIBLE WITH MULTIPLE COMMUNICATION INTERFACE SPECIFICATIONS AND POWER RECEIVER CIRCUIT THEREOF

CROSS REFERENCE

The present invention claims priority to CN201810419833.X, filed on May 4, 2018.

BACKGROUND OF THE INVENTION

Field of Invention

The present invention relates to a power supply system. In particular, the present invention relates to such power supply system compatible with multiple communication interface specifications. The present invention also relates to a power receiver circuit of the power supply system.

Description of Related Art

FIG. 1 shows a schematic diagram of configurations of the pins in a USB Type-C plug and a USB Type-C socket. In comparison to a USB Type-A plug/socket, the USB Type-C plug/socket has more pins and the distance between two neighboring pins is smaller, it is easier for the pins to suffer undesirable short circuit (for example but not limited to a short circuit between a VBUS pin and a ground pin or a short circuit between a VBUS pin and any other pin), such as due to pin deformation or existence of a foreign object. Such undesirable short circuit may result in unwanted high-temperature melt-down of pins in a power supplier side (e.g., a power adapter) or a power receiver side (e.g., a cell phone). Besides, because it is currently a transition period wherein a USB Type-A communication interface specification is being replaced by a USB Type-C communication interface specification, it is possible that a power supplier side is a USB Type-A interface while a power receiver side is a USB Type-C interface may occur, which increases the complexity in short circuit detection and protection.

In view of the above, to overcome the drawbacks in the prior art, the present invention provides a hardware (i.e., a power supply system and a power receiver circuit thereof) capable of detecting and identifying different communication interface specifications. In addition, the present invention is capable of detecting whether there is short circuit occurring in the pins, to avoid unwanted high-temperature melt-down problems.

SUMMARY OF THE INVENTION

From one perspective, the present invention provides a power supply system, comprising: a power supplier circuit, which is configured to operably supply a power via a communication interface which is compatible with a first communication interface specification or a second communication interface specification, wherein the first communication interface specification includes a delay threshold; and a power receiver circuit including a power-receiving configuration channel pin and a power-receiving pin, the power-receiving configuration channel pin and the power-receiving pin being configured to be coupled to the power supply circuit so that the power receiver circuit receives the power; wherein the power-receiving configuration channel pin and the power-receiving pin are compatible with the first communication interface specification; wherein, after the power supplier circuit is coupled to the power receiver circuit, the power supplier circuit supplies the power after a first delay period; wherein the power receiver circuit confirms whether the power supplier circuit is coupled to the power receiver circuit via a coupling confirmation step according to the first communication interface specification, and after the power receiver circuit has confirmed that the power supplier circuit is coupled to the power receiver circuit, the power receiver circuit confirms whether the power supplier circuit is compatible with the first communication interface specification or the second communication interface specification according to whether the first delay period is greater than the delay threshold.

In one embodiment, the power receiver circuit further includes: a first voltage sensing circuit, which is configured to operably sense a voltage of the power-receiving configuration channel pin, to determine whether the power receiver circuit is coupled to the power supplier circuit; a clock circuit, which is coupled to the first voltage sensing circuit and which is configured to operably generate a second delay period after the first voltage sensing circuit has determined that the power receiver circuit is coupled to the power supplier circuit, wherein the second delay period corresponds to the delay threshold; a second voltage sensing circuit, which is configured to operably sense a voltage of the power-receiving pin; and a determination circuit, which is configured to operably confirm whether the power supplier circuit is compatible with the first communication interface specification or the second communication interface specification according to the delay threshold and a level of the power.

In one embodiment, the power receiver circuit further includes: a pull-up circuit, which is configured to operably supply a pull-up power; wherein the second voltage sensing circuit, under a circumstance where the pull-up power is supplied, is configured to operably sense the voltage of the power-receiving pin, to determine whether there is a foreign object.

In one embodiment, during the second delay period, when the level of the power is not greater than a power supply threshold, the power receiver circuit supplies the pull-up power at the power-receiving pin, to determine whether the foreign object exists.

In one embodiment, the first communication interface specification is a universal serial bus power delivery (USB PD) specification which corresponds to a USB type-C pin; wherein when it is determined that the power supplier circuit is compatible with the first communication interface specification and when it is determined that the foreign object exists, the power receiver circuit disconnects the power-receiving configuration channel pin from the power supplier circuit, to control the power supplier circuit to cease supplying the power.

In one embodiment, the second communication interface specification is a universal serial bus (USB) specification which corresponds to a USB type-A pin.

In one embodiment, the delay threshold is 100 microseconds (ms).

From another perspective, the present invention provides a power receiver circuit, which is configured to be coupled to a power supplier circuit, wherein the power supplier circuit is configured to operably supply a power via a communication interface which is compatible with a first communication interface specification or a second communication interface specification, and the first communication interface specification includes a delay threshold; the power receiver circuit comprising: a power-receiving configuration channel pin and a power-receiving pin, which are configured to be coupled to the power supply circuit so that the power receiver circuit receives the power; wherein the power-receiving configuration channel pin and the power-receiving pin are compatible with the first communication interface specification; wherein, after the power supplier circuit is coupled to the power receiver circuit, the power supplier circuit supplies the power after a first delay period; wherein the power receiver circuit confirms whether the power supplier circuit is coupled to the power receiver circuit via a coupling confirmation step according to the first communication interface specification, and after the power receiver circuit has confirmed that the power supplier circuit is coupled to the power receiver circuit, the power receiver circuit confirms whether the power supplier circuit is compatible with the first communication interface specification or the second communication interface specification according to whether the first delay period is greater than the delay threshold.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
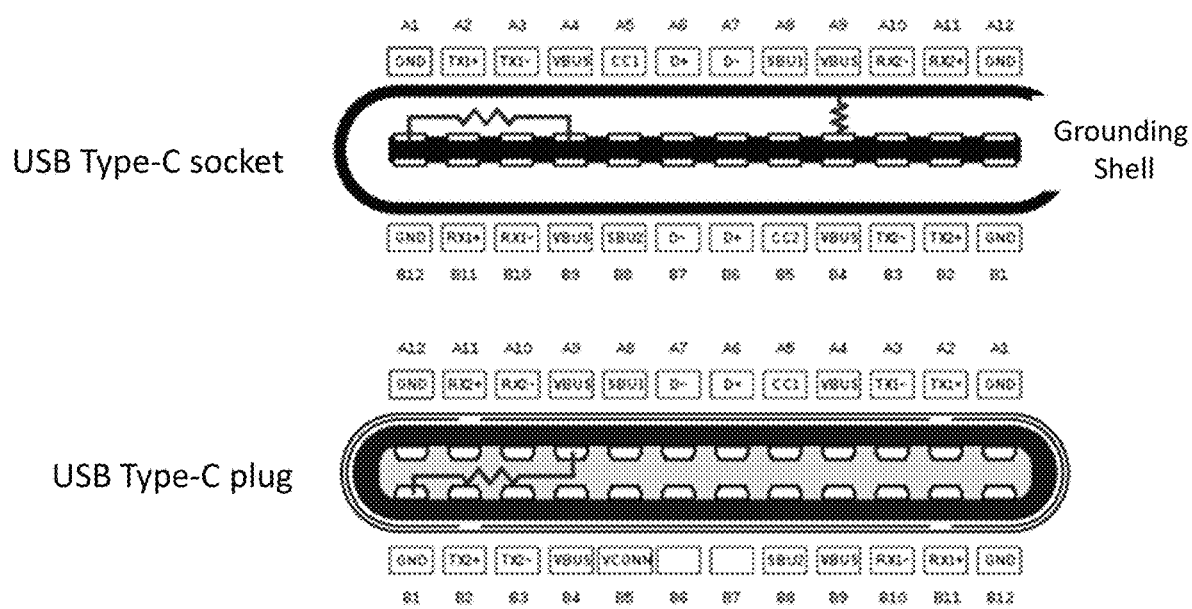
FIG. 1 shows a schematic diagram of configurations of the pins in a USB Type-C plug and a USB Type-C socket.
Figure 2:
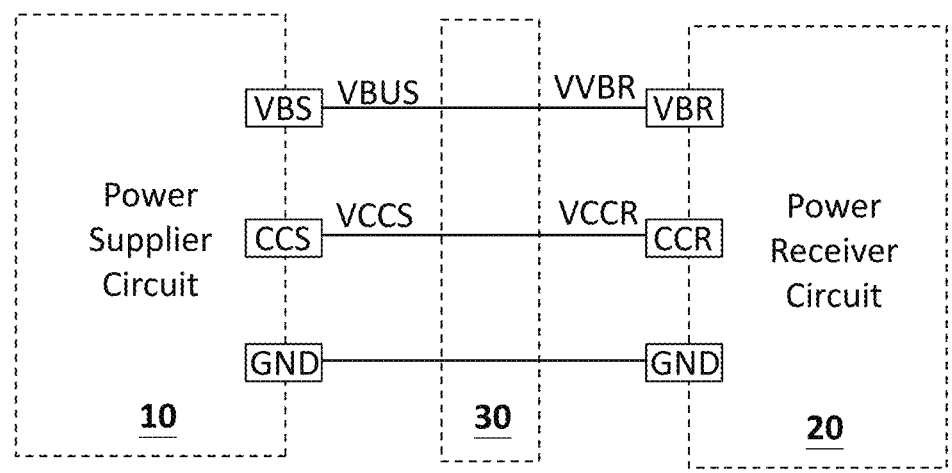
FIG. 2 shows a schematic block diagram of a power supply system according to an embodiment of the present invention.

Please refer to FIG. 2, which shows a schematic block diagram of a power supply system (i.e., power supply system 2) according to an embodiment of the present invention. The power supply system 2 comprises a power supplier circuit 10 and a power receiver circuit 20. The power supplier circuit 10 is configured to operably supply a power VBUS via a communication interface which is compatible with a first communication interface specification (for example but not limited to USB Type-C pin and power delivery specification, namely USB PD) or a second communication interface specification (for example but not limited to a USB Type-A pin and bus specification, namely USB). The first communication interface specification (i.e., USB PD) includes a delay threshold THD. In one embodiment, the delay threshold THD can be, for example but not limited to, 100 microseconds (ms). To be more specific, according to USB PD specification, after the power supplier circuit 10 is coupled to the power receiver circuit 20, the power supplier circuit 10 will not immediately output the power VBUS but will delay 100 ms or more before the power supplier circuit 10 outputs the power VBUS.

Please still refer to FIG. 2. The power receiver circuit 20 is configured to operably receive the power VBUS via power-receiving pins. In one embodiment, the power-receiving pins can be, for example but not limited to, USB Type-C pins. As shown in FIG. 2, a pin VBR and a pin CCR are coupled to the power receiver circuit 20. After the power supplier circuit 10 is coupled to the power receiver circuit 20, there is a delay period TD1 (referred to as "first delay period TD1" hereinafter) before the power supplier circuit 10 outputs the power VBUS. If the power supplier circuit 10 is a power supplier (such as a power adapter) compatible with USB PD specification, after the power supplier circuit 10 is coupled to the power receiver circuit 20, the first delay period should be more than 100 ms, that is, 100 ms is regarded as a delay threshold THD. On the other hand, if the power supplier circuit 10 is a power adapter compatible with USB specification, after the power supplier circuit 10 is coupled to the power receiver circuit 20, the power VBUS will be immediately outputted, i.e., the first delay period TD1 is far smaller than 100 ms. The above-mentioned two specifications are different from each other; the power receiver circuit 20 confirms whether the power supplier circuit 10 is coupled to the power receiver circuit 20 by coupling confirmation steps defined according to the first communication interface specification, and after the power receiver circuit 20 has confirmed that the power supplier circuit 10 is coupled to the power receiver circuit 20, the power receiver circuit 20 confirms whether the power supplier circuit 10 is compatible with the first communication interface specification or the second communication interface specification according to whether the first delay period TD1 is greater than the delay threshold THD. According to USB PD specification, the power receiver circuit 20 can confirm whether the power receiver circuit 20 is coupled to the power supplier circuit 10 according to a voltage of the power-receiving configuration channel pin CCR (the details as to how the above mechanism operates will be described later).

Figure 3:
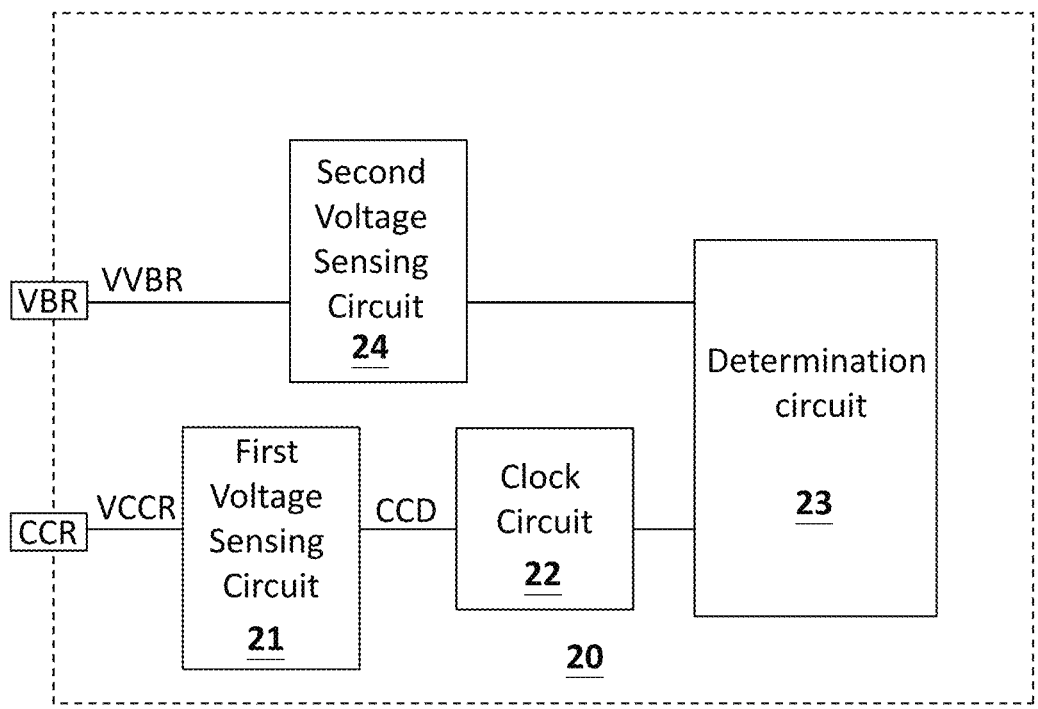
FIG. 3 shows an embodiment of a power receiver circuit of the present invention.

Please refer to FIG. 3, which shows an embodiment of a power receiver circuit (i.e., power receiver circuit 20) of the present invention. The power receiver circuit 20 includes: a power-receiving configuration channel pin CCR and a power-receiving pin VBR, a first voltage sensing circuit 21, a clock circuit 22, a second voltage sensing circuit 24 and a determination circuit 23.

The first voltage sensing circuit 21 is configured to operably sense a voltage VCCR of the power-receiving configuration channel pin CCR, to determine whether the power receiver circuit 20 is coupled to the power supplier circuit 10. The clock circuit 22 is coupled to the first voltage sensing circuit 21 and is configured to operably generate a second delay period TD2 after the first voltage sensing circuit 21 has determined that the power receiver circuit 20 is coupled to the power supplier circuit 10. The second delay period TD2 corresponds to the delay threshold THD. In one embodiment, according to USB PD specification, the second delay period TD2 can be, for example but not limited to, 100 ms.

Figure 4:
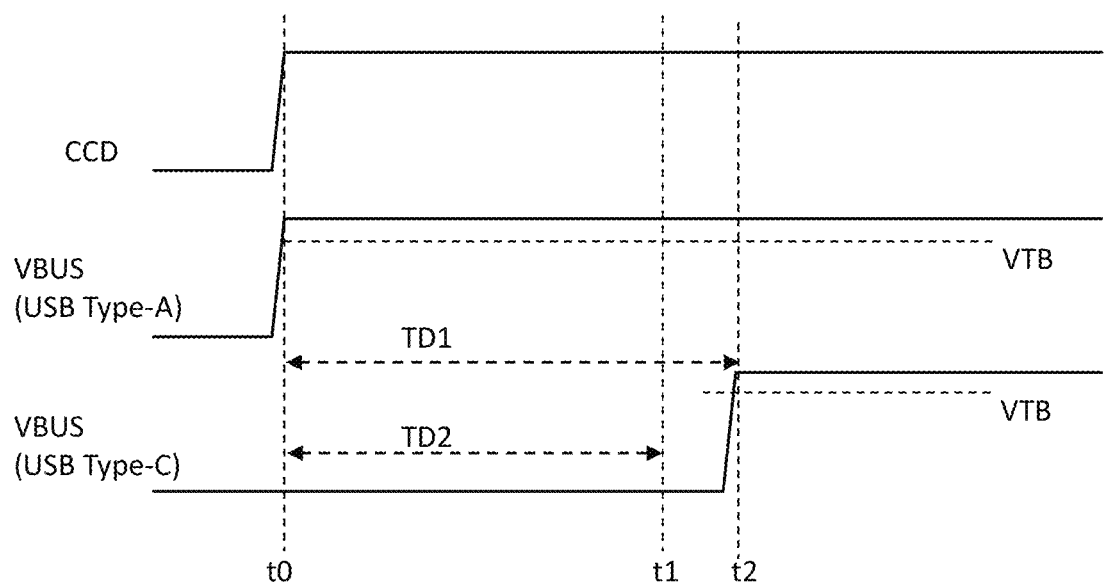
FIG. 4 shows waveforms corresponding to the embodiment of FIG. 3.

Please refer to FIG. 3 in conjugation with FIG. 4. FIG. 4 shows waveforms corresponding to the embodiment of FIG. 3. The determination circuit 23 is configured to operably confirm whether the power supplier circuit 10 is compatible with the first communication interface specification or the second communication interface specification according to the second delay period TD2 and a level of the power VBUS. To be more specific, please refer to FIG. 4. For example, when the first voltage sensing circuit 21 determines that the power receiver circuit 20 is coupled to the power supplier circuit 10 (e.g., at the time point t0 where an output CCD from the first voltage sensing circuit 21 is in a transition state), the second voltage sensing circuit 24 can sense the level of the power VBUS (as shown in FIG. 3, by sensing the level of the voltage VVBR of the power-receiving pin VBR) after a second delay period TD2 (e.g., 100 ms; referring to the time point t1 in FIG. 4) has passed. If the thus sensed level of the power VBUS does exceed a power supply threshold VTB, it can be determined that the power supplier circuit 10 supplies power through a USB type-C pin or in compliance with USP PD. If the thus sensed level of the power VBUS exceeds the power supply threshold VTB, it can be determined that the power supplier circuit 10 supplies power not through a USB type-C pin or not in compliance with USP PD. Under such circumstance, in one embodiment, it can be determined that the power supplier circuit 10 supplies power through a USB type-A pin.

Figure 5:
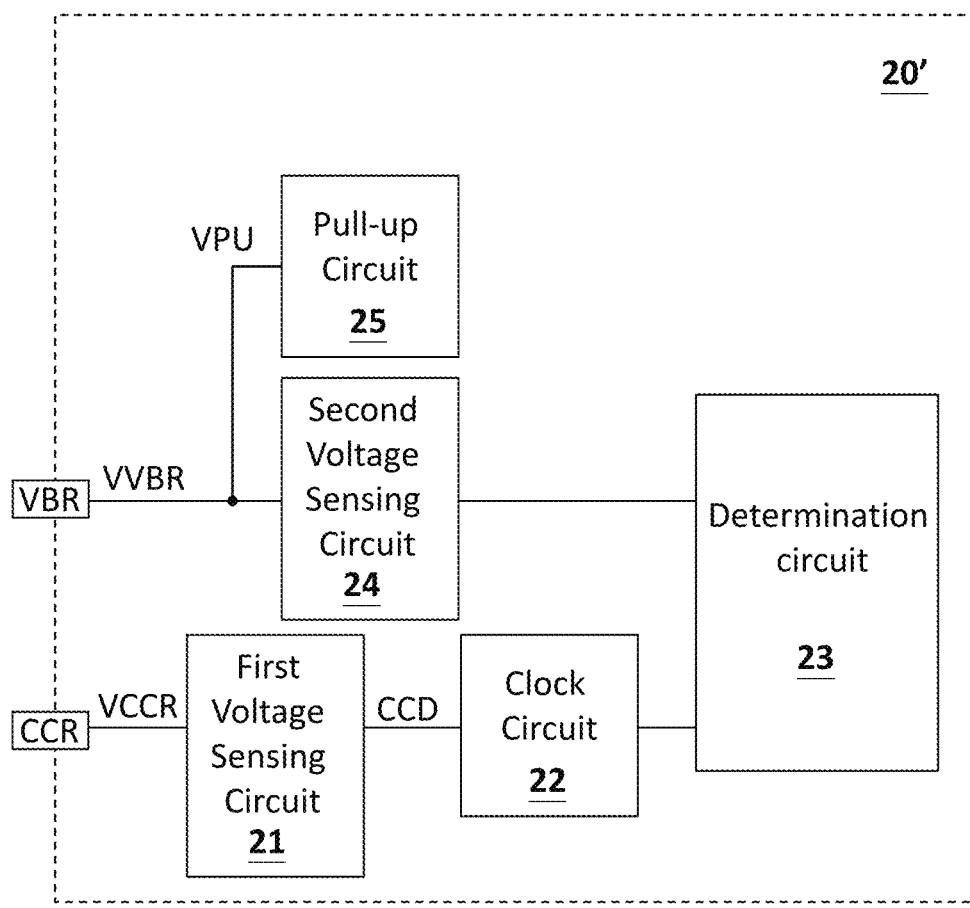
FIG. 5 shows another embodiment of a power receiver circuit of the present invention.

Please refer to FIG. 5, which shows another embodiment of a power receiver circuit (i.e., power receiver circuit 20') of the present invention. In this embodiment, the power receiver circuit 20' further includes a pull-up circuit 25. The pull-up circuit 25 is configured to operably supply a pull-up power VPU. The second voltage sensing circuit 24, under a circumstance where the pull-up power VPU is supplied, is configured to operably sense the voltage VVBR of the power-receiving pin VBR, to determine whether there is a foreign object. In one embodiment, under a circumstance where the pull-up power VPU is supplied, it is determined whether a foreign object exists by detecting whether the voltage VVBR of the power-receiving pin VBR falls within a predetermined threshold range. In one embodiment, during the second delay period TD2, when the level of the power VBUS is not greater than a power supply threshold VTB, the power receiver circuit 20 supplies the pull-up power VPU at the power-receiving pin VBR, to determine whether a foreign object exists. In one embodiment, the pull-up circuit 25 can be one of the followings or a combination thereof: a pull-up current source, a pull-up voltage source or a pull-up resistor.

In one embodiment, when it is determined that the power supplier circuit 10 is compatible with the first communication interface specification (for example but not limited to the USB Type-C pin and power delivery specification, namely USB PD) and when it is determined that a foreign object exists, the power receiver circuit 20 can disconnect the power-receiving configuration channel pin CCR from the power supplier circuit 10 (e.g., by turning off a pull-down resistor compatible with USB PD specification), to control the power supplier circuit 10 to cease supplying the power VBUS.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power supply system, comprising:
  a power supplier circuit, which is configured to operably supply a power via a communication interface which is compatible with a first communication interface specification or a second communication interface specification, wherein the first communication interface specification includes a delay threshold; and
  a power receiver circuit including a power-receiving configuration channel pin and a power-receiving pin, the power-receiving configuration channel pin and the power-receiving pin being configured to be coupled to the power supply circuit so that the power receiver circuit receives the power; wherein the power-receiving configuration channel pin and the power-receiving pin are compatible with the first communication interface specification;
  wherein, after the power supplier circuit is coupled to the power receiver circuit, the power supplier circuit supplies the power after a first delay period;
  wherein the power receiver circuit confirms whether the power supplier circuit is coupled to the power receiver circuit via a coupling confirmation step according to the first communication interface specification, and after the power receiver circuit has confirmed that the power supplier circuit is coupled to the power receiver circuit, the power receiver circuit confirms whether the power supplier circuit is compatible with the first communication interface specification or the second communication interface specification according to whether the first delay period is greater than the delay threshold.

2. The power supply system of claim 1, wherein the power receiver circuit further includes:
  a first voltage sensing circuit, which is configured to operably sense a voltage of the power-receiving configuration channel pin, to determine whether the power receiver circuit is coupled to the power supplier circuit;
  a clock circuit, which is coupled to the first voltage sensing circuit and which is configured to operably generate a second delay period after the first voltage sensing circuit has determined that the power receiver circuit is coupled to the power supplier circuit, wherein the second delay period corresponds to the delay threshold;
  a second voltage sensing circuit, which is configured to operably sense a voltage of the power-receiving pin; and
  a determination circuit, which is configured to operably confirm whether the power supplier circuit is compatible with the first communication interface specification or the second communication interface specification according to the delay threshold and a level of the power.

3. The power supply system of claim 2, wherein the power receiver circuit further includes:
- a pull-up circuit, which is configured to operably supply a pull-up power;
- wherein the second voltage sensing circuit, under a circumstance where the pull-up power is supplied, is configured to operably sense the voltage of the power-receiving pin, to determine whether there is a foreign object.

4. The power supply system of claim 3, wherein during the second delay period, when the level of the power is not greater than a power supply threshold, the power receiver circuit supplies the pull-up power at the power-receiving pin, to determine whether the foreign object exists.

5. The power supply system of claim 3, wherein the first communication interface specification is a universal serial bus power delivery (USB PD) specification which corresponds to a USB type-C pin;
- wherein when it is determined that the power supplier circuit is compatible with the first communication interface specification and when it is determined that the foreign object exists, the power receiver circuit disconnects the power-receiving configuration channel pin from the power supplier circuit, to control the power supplier circuit to cease supplying the power.

6. The power supply system of claim 5, wherein the second communication interface specification is a universal serial bus (USB) specification which corresponds to a USB type-A pin.

7. The power supply system of claim 1, wherein the delay threshold is 100 microseconds (ms).

8. A power receiver circuit, which is configured to be coupled to a power supplier circuit, wherein the power supplier circuit is configured to operably supply a power via a communication interface which is compatible with a first communication interface specification or a second communication interface specification, and the first communication interface specification includes a delay threshold; the power receiver circuit comprising:
- a power-receiving configuration channel pin and a power-receiving pin, which are configured to be coupled to the power supply circuit so that the power receiver circuit receives the power;
- wherein the power-receiving configuration channel pin and the power-receiving pin are compatible with the first communication interface specification;
- wherein, after the power supplier circuit is coupled to the power receiver circuit, the power supplier circuit supplies the power after a first delay period;
- wherein the power receiver circuit confirms whether the power supplier circuit is coupled to the power receiver circuit via a coupling confirmation step according to the first communication interface specification, and after the power receiver circuit has confirmed that the power supplier circuit is coupled to the power receiver circuit, the power receiver circuit confirms whether the power supplier circuit is compatible with the first communication interface specification or the second communication interface specification according to whether the first delay period is greater than the delay threshold.

9. The power receiver circuit of claim 8, further comprising:
- a first voltage sensing circuit, which is configured to operably sense a voltage of the power-receiving configuration channel pin, to determine whether the power receiver circuit is coupled to the power supplier circuit;
- a clock circuit, which is coupled to the first voltage sensing circuit and which is configured to operably generate a second delay period after the first voltage sensing circuit has determined that the power receiver circuit is coupled to the power supplier circuit, wherein the second delay period corresponds to the delay threshold;
- a second voltage sensing circuit, which is configured to operably sense a voltage of the power-receiving pin; and
- a determination circuit, which is configured to operably confirm whether the power supplier circuit is compatible with the first communication interface specification or the second communication interface specification according to the delay threshold and a level of the power.

10. The power receiver circuit of claim 9, further comprising:
- a pull-up circuit, which is configured to operably supply a pull-up power;
- wherein the second voltage sensing circuit, under a circumstance where the pull-up power is supplied, is configured to operably sense the voltage of the power-receiving pin, to determine whether there is a foreign object.

11. The power receiver circuit of claim 10, wherein during the second delay period, when the level of the power is not greater than a power supply threshold, the power receiver circuit supplies the pull-up power at the power-receiving pin, to determine whether the foreign object exists.

12. The power receiver circuit of claim 10, wherein the first communication interface specification is a universal serial bus power delivery (USB PD) specification which corresponds to a USB type-C pin;
- wherein when it is determined that the power supplier circuit is compatible with the first communication interface specification and when it is determined that the foreign object exists, the power receiver circuit disconnects the power-receiving configuration channel pin from the power supplier circuit, to control the power supplier circuit to cease supplying the power.

13. The power receiver circuit of claim 12, wherein the second communication interface specification is a universal serial bus (USB) specification which corresponds to a USB type-A pin.

14. The power receiver circuit of claim 8, wherein the delay threshold is 100 microseconds (ms).

* * * * *